United States Patent
Tombelli

(10) Patent No.: US 11,427,095 B2
(45) Date of Patent: Aug. 30, 2022

(54) WIRELESS CHARGING SYSTEM

(71) Applicant: ABB Schweiz AG, Baden (CH)

(72) Inventor: Fabio Tombelli, Delft (NL)

(73) Assignee: ABB SCHWEIZ AG, Baden (CH)

( * ) Notice: Subject to any disclaimer, the term of this patent is extended or adjusted under 35 U.S.C. 154(b) by 128 days.

(21) Appl. No.: 16/752,957

(22) Filed: Jan. 27, 2020

(65) Prior Publication Data

US 2020/0161901 A1 May 21, 2020

Related U.S. Application Data

(63) Continuation of application No. PCT/EP2018/070219, filed on Jul. 25, 2018.

(30) Foreign Application Priority Data

Jul. 28, 2017 (EP) .................................... 17183853

(51) Int. Cl.
| | |
|---|---|
| *B60L 53/122* | (2019.01) |
| *H02J 50/10* | (2016.01) |
| *B60L 53/12* | (2019.01) |
| *H02J 5/00* | (2016.01) |
| *B60L 53/30* | (2019.01) |

(52) U.S. Cl.
CPC ............. *B60L 53/122* (2019.02); *B60L 53/12* (2019.02); *B60L 53/30* (2019.02); *H02J 5/00* (2013.01); *H02J 50/10* (2016.02)

(58) Field of Classification Search
CPC ................................ B60L 53/122; H02J 50/10
USPC ......................................................... 320/109
See application file for complete search history.

(56) References Cited

U.S. PATENT DOCUMENTS

| | | | |
|---|---|---|---|
| 2009/0121675 A1 | 5/2009 | Ho et al. | |
| 2011/0254377 A1* | 10/2011 | Wildmer | H04B 5/0037 |
| | | | 307/104 |
| 2013/0038279 A1 | 2/2013 | Seyerle et al. | |
| 2013/0214591 A1 | 8/2013 | Miller et al. | |
| 2015/0022142 A1 | 1/2015 | Garcia Briz et al. | |
| 2017/0015206 A1* | 1/2017 | Herzog | H02J 50/10 |
| 2018/0194236 A1* | 7/2018 | Elshaer | B60L 53/12 |
| 2019/0337393 A1* | 11/2019 | Von Novak, III | B60L 53/39 |
| 2020/0156489 A1* | 5/2020 | Tombelli | B60L 53/122 |
| 2020/0290467 A1* | 9/2020 | Gao | H02J 50/90 |
| 2020/0321810 A1* | 10/2020 | Okamoto | H02J 50/12 |
| 2020/0350816 A1* | 11/2020 | Fischer | H02M 1/126 |

(Continued)

OTHER PUBLICATIONS

European Patent Office, International Search Report & Written Opinion issued in corresponding Application No. PCT/EP2018/070219, dated Oct. 11, 2018, 12 pp.

*Primary Examiner* — Suchin Parihar
(74) *Attorney, Agent, or Firm* — Greenberg Traurig, LLP

(57) ABSTRACT

A wireless charging system for electric vehicles includes an AC-to-DC converter connectable to an electric AC grid; a DC-to-AC converter interconnected with the AC-to-DC converter; a first inductive coil interconnected with the DC-to-AC converter and for inductively coupling to a second inductive coil for power transfer via an air gap; a first housing, in which the AC-to-DC converter is arranged; a second housing, in which the DC-to-AC converter and the inductive coil are arranged; and a cable for interconnecting the AC-to-DC converter and the DC-to-AC converter outside of the first housing and second housing.

20 Claims, 4 Drawing Sheets

(56) References Cited

U.S. PATENT DOCUMENTS

2021/0188106 A1* 6/2021 Asa .................... H02M 1/4233
2021/0237593 A1* 8/2021 Tombelli ................ H02J 50/12

* cited by examiner

WIRELESS CHARGING SYSTEM

FIELD OF THE INVENTION

The invention relates to the field of electric vehicles. In particular, the invention relates to a wireless charging system for electric vehicles and to a charging system arrangement.

BACKGROUND OF THE INVENTION

Wireless power transfer via inductive coils is an emerging technology that can realize electric power transmission over certain distances without physical contact. In the recent years, the transfer distance at kilowatts power level increased from several millimeters to several hundred millimeters with a grid to load efficiency above 90%. These advances make wireless power transfer very attractive to charging of electric vehicles in both stationary and dynamic charging scenarios.

The batteries of electric cars are normally charged on an electric grid. After rectification and stabilization by a converter system, the power provided is transmitted into a high-voltage system of the electric vehicle with an inductive transmission device. The inductive energy transmission typically has the advantage of being a robust and convenient energy transmission method compared with other energy transmission procedures such as conductive or cable-bound charging.

The inductive transmission device usually comprises two inductive coils, wherein a first inductive coil is provided by the wireless charging device and the second inductive coil is provided by the electric vehicle. Both coils may be seen as an air transformer.

It may be that the first inductive coil is arranged remote from the converter system, since, for example, it may be provided below a parking lot of the electric vehicle. The power transfer between the converter system and the fist inductive coil may then occur via litz wire. A litz wire may be needed due to the high switching frequency of the voltage the converter system used to supply the first inductive coil. However, litz wires may be rather expensive.

US 2015 0 022 142 A1 considers the integration of electronics components inside the receiver of an inductive power transfer system.

US 2013 0 038 279 A1 describes the integration of electronics within an inductive power transfer system to reduce the EMC (electromagnetic compatibility).

US 2013 214 591 A1 shows a charging station for charging an electrical vehicle via high-frequency power transmission between two coils. The charging station comprises an AC-DC converter with a buck-boost converter that is connected to a DC power transmission cable and a point of load converter for generating a high frequency current in a transmission coil. One AC-DC converter can be connected to several point of load converters.

US 2009 121 675 A1 relates to a control method for an inductive battery charging apparatus. Several topologies for the AC-DC converter and the DC-AC converter are mentioned and a DC link voltage can be controlled.

DESCRIPTION OF THE INVENTION

It is an objective of the invention to provide an economic and efficient wireless charging system for an electric car.

This objective is achieved by the subject-matter of the independent claims. Further exemplary embodiments are evident from the dependent claims and the following description.

An aspect of the invention relates to a wireless charging system for electric vehicles. An electric vehicle may be a street vehicle that may be driven with an electric motor, which is supplied by a battery. The wireless charging system may be used for charging the battery. Also a hybrid vehicle, i.e. a vehicle with a combustion engine and an electrical motor, may be seen as an electric vehicle.

According to an embodiment of the invention, the charging system comprises an AC-to-DC converter connectable to an electric AC grid; a DC-to-AC converter interconnected with the AC-to-DC converter; a first inductive coil interconnected with the DC-to-AC converter and for inductively coupling to a second inductive coil for power transfer via an air gap; a first housing, in which the AC-to-DC converter is arranged; a second housing, in which the DC-to-AC converter and the inductive coil are arranged; and a cable for interconnecting the AC-to-DC converter and the DC-to-AC converter outside of the first and second housings.

In other words, the AC-to-AC converter for converting the AC grid voltage into the AC voltage supplied to the first inductive coil, which AC-to-AC converter is composed of the AC-to-DC converter and the DC-to-AC converter, is distributed between two housings. The first housing, which may be arranged remote from the second housing, accommodates the AC-to-DC converter and the second housing, which may have to be arranged near the electric vehicle, accommodates the DC-to-AC converter. For example, the second housing may be situated in a ground below the electric vehicle, such as a parking lot. In such a way, the length of the electrical interconnection between the DC-to-DC converter and the first inductive coil may be made rather short. For the cable interconnecting the two housings, an ordinary cable adapted for transmitting a DC current may be used.

Additionally, since no AC current has to be transferred for a larger distance, which AC current may have a frequency of more than 10 kHz, electromagnetic interferences with the environment may be reduced compared to solutions with litz wires. The EMC of the system may be increased.

The first and second inductive coils, which are separated by an air gap, may be adapted and arranged for an inductive energy transmission device. Both first and second inductive coils may be flat coils that may be arranged substantially parallel with each other. It has to be noted that the second inductive coil is arranged outside of the second housing, for example in the underbody of the electric vehicle. With such an air transformer, energy may be transmitted across distances of several decimeter. A magnetic field that changes with time is generated with the first inductive coil. Part of the magnetic field flows through the second inductive coil and induces a current flow. The second inductive coil may be connected via a rectifier with the battery of the electric car, which then may be charged.

The wireless charging system further comprises a first controller inside the first housing for controlling the AC-to-DC converter and a second controller inside the second housing for controlling the DC-to-AC converter. The first controller may control the AC-to-DC converter (such as a boost converter) for generating a DC voltage in the DC link. The second controller may control the DC-to-AC converter (such as a full-bridge converter) for generating an AC voltage from the DC voltage to be provided to the first inductive coil. For example, the AC voltage provided to the first inductive coil may be pulse width modulated and/or may have a variable frequency to control a power transfer efficiency. A fundamental frequency of the DC-to-AC converter may be about 85 kHz and/or may be changed to a limited extent to achieve an optimum efficiency.

Furthermore, the first controller and the second controller are communicatively interconnected with a signal line that is provided in the cable. The controllers may be interconnected with a signal line that may be provided in the same cable jacket as the cable for transferring the DC current between the two housings. No electromagnetic shielding between the DC current cable and the signal line may be necessary.

With the communication connection, the control of the switching frequency, the power transfer and/or the DC link voltage may be synchronized between the first and second controller.

Also, error signals may be transmitted between the fist controller and the second controller via the signal line. In the case of an error, both converters may be shut down.

According to an embodiment of the invention, the first controller and/or the second controller are adapted for controlling a power transfer between the AC-to-DC converter and the DC-to-AC converter by varying a DC link voltage of a DC link between the AC-to-DC converter and the DC-to-AC converter. The DC link voltage may not be controlled to a fixed voltage but may be variable. This may be possible since due to the rather short distance between the DC-to-AC converter and the second inductive coil, also the power transfer there may be controlled in a more flexible way.

According to an embodiment of the invention, the first controller is adapted to control a DC link voltage to a variable setpoint voltage. The height of the setpoint voltage may determine a power transferred to the DC-to-AC converter inside the second housing.

According to an embodiment of the invention, the first controller receives a power demand of the second controller via the signal line and determines the variable setpoint voltage from the power demand.

According to an embodiment of the invention, the wireless charging system further comprises at least two second housings, wherein each second housing comprises a DC-to-AC converter interconnected with the AC-to-DC converter and comprises an inductive coil interconnected with the DC-to-AC converter. In other words, more than one charging adapter composed of a DC-to-AC converter and a first inductive coil inside a common housing may be interconnected with the AC-to-DC converter, provided in the first housing. The charging adapters all may be connected to the same DC link.

According to an embodiment of the invention, a second controller is arranged inside each second housing for controlling the DC-to-AC converter inside the respective housing. Also in this case, a signal line from each second controller to the first controller may be arranged inside the DC cable interconnecting the respective DC-to-AC converter with the AC-to-DC converter.

According to an embodiment of the invention, the first controller receives power demands of the second controllers via the signal line and determines the variable setpoint voltage from the power demands. For example, the power demands may be summed up and therefrom, the setpoint voltage can be calculated.

According to an embodiment of the invention, each second controller is adapted to control a duty cycle and/or a frequency of an AC voltage provided to the first inductive coil. With the duty cycle and/or the frequency, the power supplied to the first inductive coil may be controlled. This power may be equal to the power demand transmitted to the first controller.

According to an embodiment of the invention, the second housing is a ground adapter for being placed in the surface of a parking lot for an electric vehicle. The second housing may have a flat body and/or the first inductive coil may be a substantially flat coil arranged inside the flat body.

According to an embodiment of the invention, a compensation capacitor, which is interconnected between the DC-to-AC converter and the first inductive coil, is arranged inside the second housing. The first inductive coil and the compensation capacitor may form an oscillating circuit. Also the second inductive coil and a corresponding compensation capacitor may form such an oscillating circuit. The two oscillating circuits may be in resonance to improve the power transfer. In this way, an energy transmission with efficiency of up to 95% can be achieved.

According to an embodiment of the invention, a DC link with a DC link capacitor, which is interconnected between the AC-to-DC converter and the DC-to-AC converter, is arranged inside the first housing. Such a DC link capacitor may stabilize the voltage in the DC link. Furthermore, when more than one DC-to-AC converters with interconnected first coils are connected to the AC-to-DC converter, the DC link capacitors inside the first housing may be shared.

There are several possible topologies for the AC-to-DC converter and the DC-to-AC converter, which, however, are not limited by the following embodiments.

According to an embodiment of the invention, the DC-to-AC converter is a full-bridge converter. A full-bridge converter may comprise a half-bridge for each phase of the converter. A half-bridge may comprise two series-connected switching devices, such as transistors or thyristors.

In general, the AC-to-DC converter may be an active front end or passive front end. It may be a single phase or three phase converter.

According to an embodiment of the invention, the AC-to-DC converter comprises a boost converter and/or a passive rectifier. A boost converter may comprise an inductance connected in series with a diode and switching device, such as a transistor or thyristor, that is connected between the inductance and the diode. The passive rectifier may generate a DC voltage that is boosted by the boost converter.

According to an embodiment of the invention, the AC-to-DC converter comprises a full-bridge converter. It has to be noted that the AC-to-DC converter may be a one-phase or three-phase converter. The DC-to-AC converter may be a one-phase converter.

Furthermore, the AC-to-DC converter may comprise a passive input filter, which may be composed of inductances and/or capacitors.

A further aspect of the invention relates to a charging system arrangement, which comprises a wireless charging system as described in the above and in the following and an electric vehicle with a second inductive coil inductively coupled with the first inductive coil provided by the wireless charging system. The electric vehicle may be adapted for being charged by the wireless charging system. The second inductive coil may be connected via a passive rectifier with the battery of the electric vehicle.

According to an embodiment of the invention, the second housing is placed in a ground below the electric vehicle and the second inductive coil is provided at the bottom side of the electric car. The cable interconnecting the second housing with the first housing also may be at least partially in the ground.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
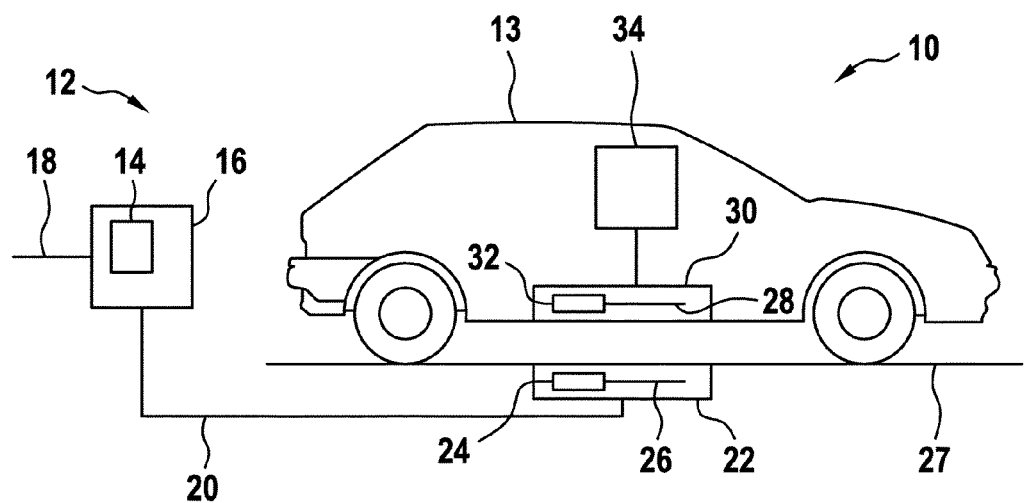
FIG. 1 schematically shows a charging system arrangement according to an embodiment of the invention.

FIG. 1 shows a charging system arrangement 10 comprising a wireless charging system 12 and an electric vehicle 13.

The wireless charging system 12 comprises an AC-to-DC converter 14 in a first housing 16, which converts an AC current from an electrical grid 18 into a DC current. The DC current is transferred via a cable 20 from the first housing 16 to a second housing 22, which accommodates a DC-to-AC converter 24 and a first inductive coil 26.

The first housing 16, for example, may be connected to a wall. The second housing 22 may be arranged below the electric vehicle 13 in a ground 27, for example in a parking lot.

The DC-to-AC converter generates a high frequency current, which is supplied to the first inductive coil.

The first inductive coil 26 is inductively coupled with a second inductive coil 28 in an on-board charging device 30 of the electrical vehicle 13. The AC current induced in the second inductive coil 28 is rectified by a rectifier 32 inside the electric vehicle 13 and supplied to a battery 34 of the electric vehicle 13.

Figure 2:
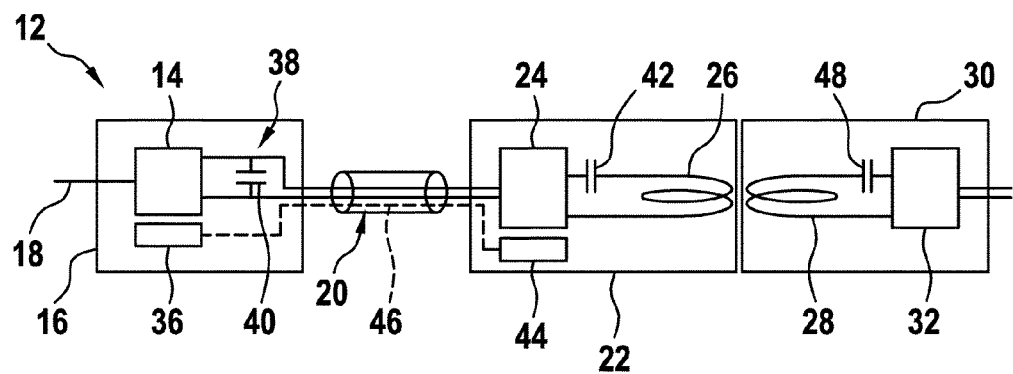
FIG. 2 schematically shows a wireless charging system according to an embodiment of the invention.

FIG. 2 shows the wireless charging system 12 in more detail. It can be seen that besides the AC-to-DC converter 14, a controller 36 for the AC-to-DC converter 14 and a DC link 38 with a DC link capacitor 40 is arranged inside the first housing 16.

In the second housing 22, a compensating capacitor 42 is interconnected between the DC-to-AC converter 24 and the first inductive coil 26 for forming a resonant circuit. Furthermore, a controller 44 for the DC-to-AC converter 24 is arranged in the second housing 22.

The first controller 36 and the second controller 44 are interconnected with a signal line 46 that may be guided in the same cable jacket as the cable 20 for conducting the DC current between the first housing 16 and the second housing 22.

The first controller 36 controls switching devices of the AC-to-DC converter to generate a DC current of varying voltage in the DC link 38.

The second controller 44 controls switching devices of the DC-to-AC converter 24 to convert the varying voltage in the DC link 38 into the high frequency current supplied to the first inductive coil 26. The second controller 44 may control a duty cycle and/or a frequency of the AC voltage provided to the first inductive coil 26. For example, the voltage in the grid 18 may have a voltage of 50 Hz or 60 Hz. On the other hand, a pulse width modulated current and/or AC voltage in the first inductive coil may have a frequency of more than 10 kHz. To control the power transfer from the AC-to-DC converter to the DC-to-AC converter via the DC link 38 and/or the power transfer from the DC-to-AC converter into the first inductive coil 26, the controllers 36, 44 may exchange information via the signal line 46, such as a power demand to be supplied to the electric vehicle.

As shown in FIG. 2, the on-board charging device 30 also may have a compensating capacitor 48, which is interconnected between the rectifier 32 and the second inductive coil 28 for forming a resonant circuit.

Figure 3:
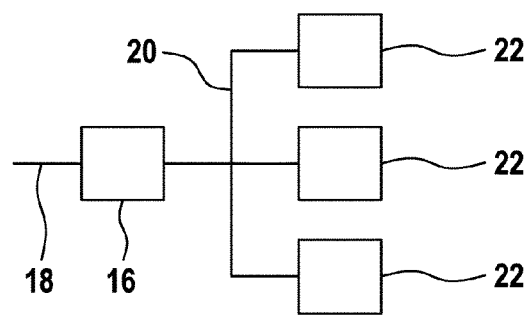
FIG. 3 schematically shows a wireless charging system according to a further embodiment of the invention.

FIG. 3 shows that more than one housing 22 may be connected with a DC current conducting cable 20 with the first housing 16. It has to be understood that the housings 22 shown in FIG. 3 may all contain the components shown in FIG. 2 and/or described above and below.

It may be that the first controller 36 in the first housing 16 controls the DC link voltage of the DC link 20 to a variable setpoint voltage, which depends on the power demands of the DC-to-AC converters 24 in the second housings 22. All these converters 24 may be connected via the cable 20 to the DC link 40 and/or may be controlled by second controllers 44 in the housings 22.

The first controller 36 may receive a power demand from each of the second controllers 44 via the signal line 46 and may determine the variable setpoint voltage from these power demands. The power output of each DC-to-AC converter 24 may be controlled via the frequency and/or duty cycle of the AC voltage supplied to the respective first inductive coil 26. The overall power output may be controlled by the DC link voltage.

Figure 4:
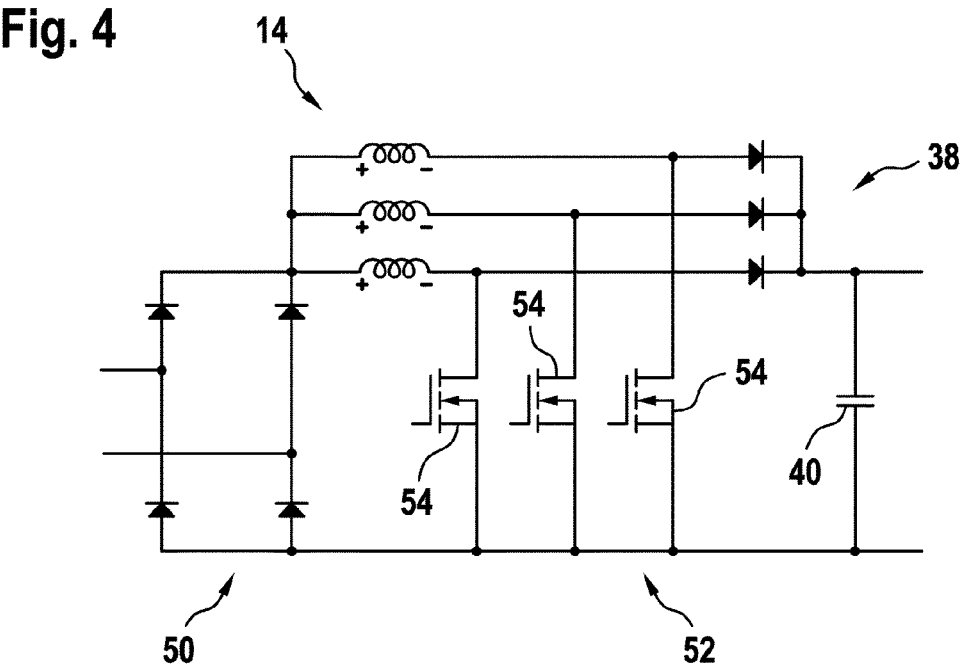
FIG. 4 shows a schematic circuit diagram for an AC-to-DC converter of a wireless charging system according to an embodiment of the invention.

FIG. 4 shows an example for an AC-to-DC converter 14, which is composed of a passive rectifier 50 and a boost converter 52. The passive rectifier 50 comprises two diode half-bridges. The boost converter 52 comprises three paralleled arms of an inductance series-connected with a diode and a switching device 54, which is connected between the inductance and the diode. The switching devices 54 may be controlled by the controller 36.

Figure 5:
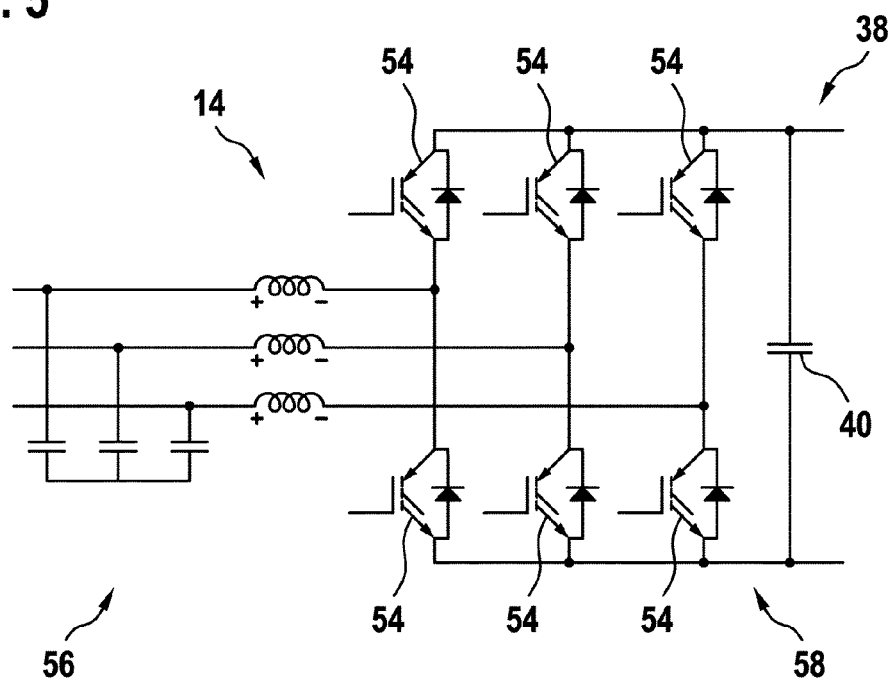
FIG. 5 shows a schematic circuit diagram for a further AC-to-DC converter of a wireless charging system according to an embodiment of the invention.

FIG. 5 shows a further example for an AC-to-DC converter 14, which is composed of a passive input filter 56 and a three-phase full-bridge converter 58. The passive input filter 56 comprises three single-phase LC-filters, which are star-connected via capacitors. The full-bridge converter 58 comprises three half-bridges of series-connected switching devices 54. The switching devices 54 may be controlled by the controller 36.

Figure 6:
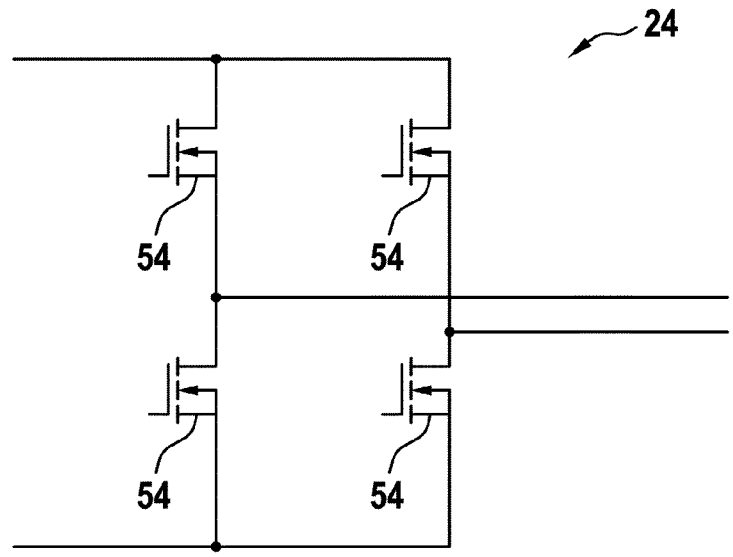
FIG. 6 shows a schematic circuit diagram for a DC-to-AC converter of a wireless charging system according to an embodiment of the invention.

FIG. 6 shows an example for a DC-to-AC converter 24, which is a single-phase full-bridge converter. The DC-to-AC converter 24 comprises two half-bridges of series-connected switching devices 54. The switching devices 54 may be controlled by the controller 44.

Figure 7:
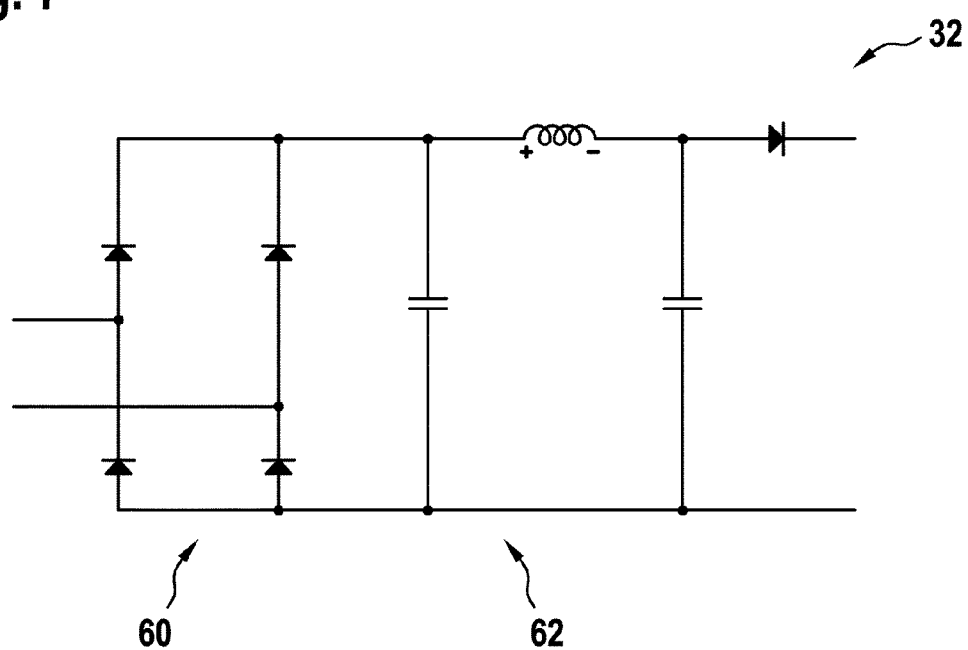
FIG. 7 shows a schematic circuit diagram for a rectifier used in a charging system arrangement according to an embodiment of the invention.

FIG. 7 shows an example for a rectifier 32, which may be employed in the on-board charging device 30. The rectifier comprises a passive rectifier 60 composed of two diode half-bridges and a CLC output filter 62. A diode may prevent an inverse current flow from the battery 34 into the rectifier 32.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 charging system arrangement
12 wireless charging system
13 electric vehicle
14 AC-to-DC converter
16 first housing
18 electrical grid
20 cable
22 second housing
24 DC-to-AC converter
26 first inductive coil
27 ground, parking lot
28 second inductive coil
30 on-board charging device
32 rectifier
34 battery
36 first controller
38 DC link
40 DC link capacitor
42 compensating capacitor
44 second controller
46 signal line
48 compensating capacitor
50 passive rectifier
52 boost converter
54 switching device
56 input filter
58 three-phase full-bridge converter
60 passive rectifier
62 output filter

The invention claimed is:

1. A wireless charging system for electric vehicles, the charging system comprising:
    an AC-to-DC converter connectable to an electric AC grid;
    a DC-to-AC converter interconnected with the AC-to-DC converter;
    a first inductive coil interconnected with the DC-to-AC converter and for inductively coupling to a second inductive coil for power transfer via an air gap;
    a first housing, in which the AC-to-DC converter is arranged;
    a second housing, in which the DC-to-AC converter and the first inductive coil are arranged;
    a cable for interconnecting the AC-to-DC converter and the DC-to-AC converter outside of the first housing and second housing;
    a first controller inside the first housing for controlling the AC-to-DC converter;
    a second controller inside the second housing for controlling the DC-to-AC converter;
    wherein the first controller and the second controller are communicatively interconnected with a signal line that is provided in the cable.

2. The wireless charging system of claim 1, wherein the first controller and/or the second controller are adapted for controlling a power transfer between the AC-to-DC converter and the DC-to-AC converter by varying a DC link voltage of a DC link between the AC-to-DC converter and the DC-to-AC converter.

3. The wireless charging system of claim 1,
    wherein the first controller is adapted to control a DC link voltage to a variable setpoint voltage.

4. The wireless charging system of claim 3, wherein the first controller receives a power demand of the second controller via the signal line and determines the variable setpoint voltage from the power demand.

5. The wireless charging system of claim 4, further comprising:
    at least two second housings;
    wherein each second housing comprises a DC-to-AC converter interconnected with the AC-to-DC converter and comprises a first inductive coil interconnected with the DC-to-AC converter;
    wherein a second controller is arranged inside each second housing for controlling the DC-to-AC converter inside the respective housing.

6. The wireless charging system of claim 5,
    wherein the first controller receives power demands of the second controllers via the signal line and determines the variable setpoint voltage from the power demands.

7. The wireless charging system of claim 1, wherein the second controller is adapted to control a duty cycle and/or a frequency of an AC voltage provided to the first inductive coil.

8. The wireless charging system of claim 1, wherein the second housing is a ground adapter for being placed in the ground of a parking lot for an electric vehicle.

9. The wireless charging system of claim 1, wherein a compensation capacitor, which is interconnected between the DC-to-AC converter and the first inductive coil, is arranged inside the second housing.

10. The wireless charging system of claim 1, wherein a DC link with a DC link capacitor, which is interconnected between the AC-to-DC converter and the DC-to-AC converter, is arranged inside the first housing.

11. The wireless charging system of claim 1, wherein the DC-to-AC converter is a full-bridge converter.

12. The wireless charging system of claim 1, wherein the AC-to-DC converter comprises a boost converter and/or a passive rectifier.

13. The wireless charging system of claim 1, wherein the AC-to-DC converter comprises a full-bridge converter.

14. A charging system arrangement, comprising:
    a wireless charging system according to claim 1; and
    an electric vehicle with a second inductive coil inductively coupled with the first inductive coil provided by the wireless charging system, wherein the electric vehicle is adapted for being charged by the wireless charging system.

15. The charging system arrangement of claim 14, wherein the second housing is placed in a ground below the electric vehicle and the second inductive coil is provided at a bottom side of the electric vehicle.

16. The wireless charging system of claim 6, wherein the second controller is adapted to control a duty cycle and/or a frequency of an AC voltage provided to the first inductive coil.

17. The wireless charging system of claim 16, wherein the second housing is a ground adapter for being placed in the ground of a parking lot for an electric vehicle.

18. The wireless charging system of claim 17, wherein a compensation capacitor, which is interconnected between the DC-to-AC converter and the first inductive coil, is arranged inside the second housing.

19. The wireless charging system of claim 18, wherein a DC link with a DC link capacitor, which is interconnected between the AC-to-DC converter and the DC-to-AC converter, is arranged inside the first housing.

20. The wireless charging system of claim 2, wherein the first controller is adapted to control a DC link voltage to a variable setpoint voltage.

* * * * *